US011975224B2

(12) United States Patent
Bartz (10) Patent No.: US 11,975,224 B2
(45) Date of Patent: May 7, 2024

(54) UNMANNED AERIAL VEHICLE (UAV) CONTROLLED NETTING SYSTEM AND METHOD THEREOF

(71) Applicant: Bradley Lawrence Bartz, Los Angeles County, CA (US)

(72) Inventor: Bradley Lawrence Bartz, Los Angeles County, CA (US)

(73) Assignee: BRADLEY LAWRENCE BARTZ, Los Angeles County, CA (US)

( * ) Notice: Subject to any disclaimer, the term of this patent is extended or adjusted under 35 U.S.C. 154(b) by 307 days.

(21) Appl. No.: 17/188,057

(22) Filed: Mar. 1, 2021

(65) Prior Publication Data
US 2021/0269151 A1    Sep. 2, 2021

Related U.S. Application Data

(60) Provisional application No. 62/982,450, filed on Feb. 27, 2020.

(51) Int. Cl.
*A62C 3/02*    (2006.01)
*B64U 10/13*    (2023.01)
*B64U 101/47*    (2023.01)

(52) U.S. Cl.
CPC .......... *A62C 3/0228* (2013.01); *A62C 3/0257* (2013.01); *B64U 10/13* (2023.01); *B64U 2101/47* (2023.01)

(58) Field of Classification Search
CPC ... B64U 70/30; B64U 2101/47; B64F 1/0295; A62C 3/0257; A62C 3/0228; A62C 2/06
See application file for complete search history.

(56) References Cited

U.S. PATENT DOCUMENTS

| | | | | |
|---|---|---|---|---|
| 3,635,290 A | * | 1/1972 | Schneider | A62C 3/0257 169/48 |
| 3,980,259 A | * | 9/1976 | Greenhalgh | B64C 39/024 244/116 |
| 4,699,338 A | * | 10/1987 | Penberthy | B64D 17/14 244/152 |
| 4,753,400 A | * | 6/1988 | Reuter | B64F 1/027 244/116 |
| 10,458,757 B1 | * | 10/2019 | Kearney-Fischer | F41H 11/02 |
| 2016/0251088 A1 | * | 9/2016 | Melish | B64C 39/024 244/110 C |
| 2019/0176987 A1 | * | 6/2019 | Beecham | G08B 17/005 |
| 2019/0346241 A1 | * | 11/2019 | Metz | F42B 10/62 |
| 2021/0109547 A1 | * | 4/2021 | Clark | G05D 1/0816 |
| 2022/0001222 A1 | * | 1/2022 | Dor | B64D 1/16 |

* cited by examiner

*Primary Examiner* — Joshua J Michener
*Assistant Examiner* — Arfan Y. Sinaki (57) ABSTRACT

Systems and methods are provided for controlling a netting by an Unmanned Aerial Vehicle (UAV). A mesh netting includes a plurality of nettings arranged as interspersed layers in a mesh form. Each of the plurality of nettings has fire-resistant property. Further, a battery powered UAV is present at an aerial location. The mesh netting is coupled to the UAV such that the UAV maintains the mesh netting afloat and adjusts at a position such that a particular source of flying embers is covered with the mesh netting. Also, a lifting kite coupled to the UAV at one end and attached to the mesh netting at another end is provided. The lifting kite carries and holds the mesh netting aloft when the UAV brings the lifting kite at an aloft position such that a particular source is covered with the mesh netting.

5 Claims, 7 Drawing Sheets

UNMANNED AERIAL VEHICLE (UAV) CONTROLLED NETTING SYSTEM AND METHOD THEREOF

CROSS-REFERENCE TO RELATED APPLICATIONS

This application claims priority benefits under 35 U.S.C. §119(e) to U.S. Provisional Application No. 62/982,450 filed on Feb. 27, 2020, which is hereby incorporated by reference in its entirety.

FIELD OF THE INVENTION

This invention relates to the field of controlling and suppressing spread of wildfires. More particularly, this invention relates to a system and method for using a mesh netting controlled by an Unmanned Aerial Vehicle (UAV) for suppression and containment of wildfires.

BACKGROUND OF THE INVENTION

Typically, wildfires can burn millions of acres of land and forests at shockingly fast speeds, consuming everything encountered in their paths. The rolling flames may travel up to a speed of 14 miles an hour, and may cause destructiveness to life, property, and the environment, which is often grave. Also, wildfires occur rapidly and the devastation thus caused typically lasts for over a period of days or weeks, or even months. Unlike other natural calamities and disasters, (for example, earthquakes and landslides), wildfires can be combatted to a large extent and their destructiveness can be limited or controlled. Thus, significant opportunities exist to deploy firefighting resources in a rapid and effective manner to achieve goals of protection of life, property and the environment, as well as to extinguish the wildfire or at least limit the wildfire in intensity or to regions that have low environmental sensitivity.

Though conventional mechanisms that employ application of water or fire suppressing chemicals to a fire from the ground may be effective for combatting wildfires, lack of suitably trained manpower, threat to firefighters' lives, unpredictability of wildfires, and scarcity of water/chemicals may pose a serious challenge. Moreover, when the terrain is challenging, which is mostly the case in forest fires, transporting the required amounts of water or chemicals may make the situation even worse. In light of the foregoing discussion, there is a need for an efficient and a cost-effective technique for combating the spread of the wildfire.

SUMMARY OF THE INVENTION

In order to solve the above problems, the present invention discloses a netting system and method that is held aloft and controlled by an Unmanned Aerial Vehicle (UAV). The UAV employs an airborne mesh based netting to capture flying embers (particularly from trees that constitute as "fire-bombs") that fly and scatter in the surroundings. The netting captures the released embers, thereby preventing them from either travelling far or from hitting fresh fuel-containing ground before they land. By capturing and containing the released flying embers, the invention may significantly slow down the spread of wildfire, thus aiding other firefighting efforts. As a result, the invention provides valuable time for living beings present in path of the fire to evacuate and/or otherwise prepare for safety.

In one aspect of the present invention, the invention provides a UAV controlled netting system and method where the netting is maintained aloft for controlling wildfires by capturing released flying embers.

In one aspect of the present invention, the invention provides the UAVs that are drones. The drones are typically powered using power obtained from batteries, and thus have an ability to remain powered in flight and being unaffected by smoke and fire, which could choke a UAV or manned aircraft powered by an internal combustion engine. Further, battery powered drones may have lift capacities of nearly 2,000 lbs. The present invention leverages the ability of battery-operated high lift capacity drones to rapidly carry fire nettings and deploy and hold them over rugged terrain in wildfire environments that is otherwise hard to access.

In one aspect of the present invention, the UAV includes video cameras that facilitate the drones to be remotely operated, as well as with automatic "return to base" capability if communication between the UAV and an associated base station controller is interrupted. Preferably, the UAV of the present invention may also be equipped with thermal sensing and imaging capability and may have an ability to autonomously identify and target ember sources, such as, burning trees, through Artificial Intelligence (AI) and image or pattern recognition algorithms.

In one aspect of the present invention, the drones are programmed to operate as a group, and/or independently to avoid other drones while carrying out similar tasks. Plurality of the drones operating in a group are sometimes referred to as swarm drones. Further, when the drones are programmed to operate as a group, the netting is carried and held aloft by two or more drones for capturing flying embers.

In one aspect of the present invention, the netting is preferably of a strong, lightweight, and fire-resistant material such as Kevlar® or a similar material. The mesh of the netting is tight enough to contain dangerous flying embers, yet loose enough to allow wind to flow through sufficiently so that the netting can be carried and held in strong wind by the UAV. The material of the netting may be multi-layered and interspersed to maximize ability of the netting to catch and stop embers while allowing wind to flow through with minimum resistance.

In one aspect of the present invention, the netting when attached and deployed with the UAV has the shape of a round parachute. The netting may be tethered to a single UAV by a single cord having fire-resistant property. Further, in another aspect of the present invention, the netting is of a square or rectangular shape. The netting is attached and carried by two UAVs that are present at each of a top corner of the netting, and each of bottom corners of the netting are fixed using ballasts, and/or carried by two additional UAVs. The four UAVs operate together to carry the netting to a target location and cooperate to hold the netting in an optimum shape and at an appropriate location to catch embers from a target ember source. In yet another aspect of the invention, the netting is initially rolled into a roll, and when the drones reach a target point they unfurl the netting in order to capture the embers.

In one aspect of the present invention, for capturing embers during a stationary operation, the netting is held aloft by one or more lifting kites. Many different kite designs are used as lifting kites. An example of such lifting kites may include, but is not limited to a "French Military Kite" or a "Rescue Kite" which is a triangular winged box kite that is similar to a classic box kite but has only three sides to the box instead of four and further has dihedral wings added to one surface, which increases its side to side stability. This type of kite is favored due to its ability to lift payloads (for example, antennas) in a wide variety of conditions. Further, the kites may be accurately positioned in the sky via one or more UAVs that are attached directly to, or otherwise tethered to, the kites. In another aspect, as the weight of the netting is borne by one or more kites instead of the UAV, the flying time of the UAV is greatly increased.

In one aspect of the present invention, the UAVs may carry a small supply of water or other fire-suppressant material, such as, Phos-Chek®. A spray of the suppressant material is directed to the embers that may have been caught in the netting.

In one aspect of the present invention, during stationary operation, the UAVs are tethered to the ground. When tethered, the UAVs are supplied with electrical power from a direct electric source allowing them to stay aloft as long as needed. Tethered UAVs may also be supplied with water or other fire-suppressant material, such as, Phos-Chek® from the ground via a tube or hose. The UAVs may direct a spray of the fire-suppressant material onto the embers caught in the netting. Alternatively, the UAVs may carry an onboard supply of water or other fire-suppressant liquid or material that is sprayed onto embers caught within the net.

In one aspect of the present invention, the UAV carries a netting and positions it over a tree such as a palm tree, either before or after the tree has caught fire, and releases the netting, thereby encapsulating the tree and thus significantly reducing the large burning embers that will be shed from it.

In one aspect of the present invention, the netting is integrated with the lifting kite during construction of lifting kites thereby defining a large self-lifting fire net. The self-lifting fire net may be accurately steered and positioned by one or more UAVs that are preferably electric powered.

In one aspect of the present invention, the invention is of a method for providing a UAV to control a netting being used in suppressing wildfire and the spread thereof. The method includes having a lifting kite and/or one or more UAVs that may carry aloft a netting made of a fire-resistant material, and then may transport that fire netting and position it at a location relative to a source or potential source of embers. This may enable catching embers that are shed from the ember source before these embers are carried away by wind and a new ignition point is created.

In one aspect of the present invention, stationary environments where tethered UAVs and/or lifting kites may be used include: properties which are protected at their perimeters by an airborne fire netting system, single buildings, tall trees, or other elements which are particularly vulnerable to fire and hence require targeted protection; or locations where a fire line is desired, for example, along a freeway that already presents a natural fire barrier and is thus a good candidate for stopping flying embers. This ensures that wildfires do not jump the freeway as a result of flying embers.

As described above, the system and the method are used to capture flying embers to control spread of wildfire. Further, other application areas for the system and the method may include, but are not limited to containment of pollens released by plants, airborne dust and debris released at construction/demolition premises, radioactive material released during eruption of volcano, debris produced during occurrence of earthquake or landslide, locust swarms or similar pest infestation, and the like.

One advantage of the present invention includes providing a netting arranged as a mesh structure that is strong, lightweight, and is fire-resistant.

One advantage of the present invention includes enabling the lightweight netting to be carried and held by the UAV even during strong wind conditions.

One more advantage of the present invention includes an ability of multi-layered interspersed structure of the netting to maximize an ability to catch fire embers while allowing wind to pass through with minimum wind resistance.

One more advantage of the present invention includes the lift kite to bear weight of the netting thus substantially increasing operating time of the UAV.

The summary of the invention is not intended to limit the key features and essential technical features of the claimed invention and is not intended to limit the scope of protection of the claimed embodiments.

BRIEF DESCRIPTION OF THE DRAWINGS

The object of the invention may be understood in more detail and particular description of the invention briefly summarized above by reference to certain embodiments thereof which are illustrated in the appended drawings, which drawings form a part of this specification. it is to be noted, however, that the appended drawings illustrate preferred embodiments of the invention and are therefore not to be considered limiting in scope, for the invention may admit to other equally effective equivalent embodiments.

DETAILED DESCRIPTION OF THE INVENTION

The present invention will now be described by reference to more detailed embodiments. This invention may, however, be embodied in different forms and should not be construed as limited to the embodiments set forth herein. Rather, these embodiments are provided so that this disclosure will be thorough and complete, and will fully convey the scope of the invention to those skilled in the art.

Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. As used in the description of the invention and the appended claims, the singular forms "a,", "an," and "the" are intended to include the plural forms as well, unless the context clearly indicates otherwise.

Figure 1:
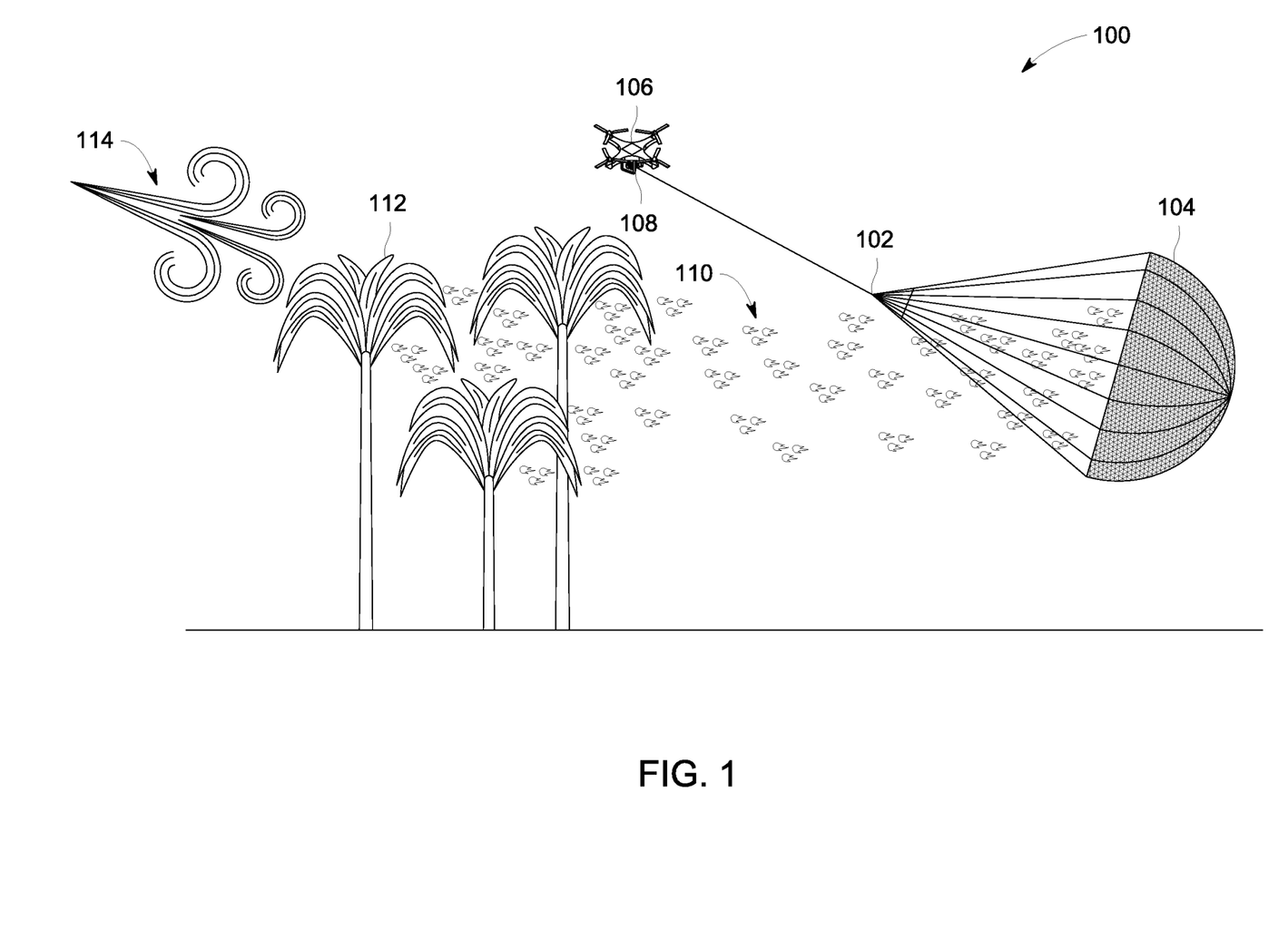
FIG. 1 illustrates an exemplary Unmanned Aerial Vehicle (UAV) controlled netting system in form of a parachute for capturing embers produced during wildfire, in accordance with an embodiment of the present invention.

With reference to FIG. 1, an exemplary Unmanned Aerial Vehicle (UAV) controlled netting system 100 in the form of a parachute for capturing flying embers 110 produced during a wildfire 112, is illustrated in accordance with an embodiment of the present invention. The wildfire 112 may be burning and spreading in forests, grasslands, savannas, and other ecosystems due to occurrence of high-speed winds 114. Due to occurrence of the high-speed winds 114, the flying embers 110 may be generated from burning trees (as is illustrated in the FIG. 1) that may subsequently get air-borne and may flow in the direction of the high-speed winds 114 leading to spread of the wildfire 112 in surrounding areas.

As shown, the system 100 includes a UAV 106 (interchangeably referred to herein as a drone) and a netting 102 (interchangeably referred to herein as a flying fire netting or a fire net) that is operatively coupled to the UAV 106. It will be apparent to a person skilled in the art that the UAV 106 may be replaced by a manned aerial vehicle or a semi-autonomous aerial vehicle. The UAV 106 may be equipped with a plurality of sensors (not shown in FIG. 1). Examples of the plurality of sensors may include, but are not limited to temperature sensors, anemometer (to sense wind speed and direction), a Global Positioning System (GPS) sensor, gyroscope, accelerometer, pressure sensors, optical cameras, thermal cameras (to capture infrared images), Light Detection and Ranging (LiDAR) sensor (to create a three Dimensional (3D) representation of a surveyed environment), proximity sensors, radiation sensors (to sense the presence of alpha, beta, or gamma particles), particle sensors (to sense dust, embers, and other airborne particulates), flow sensors (to sense the movement of gases, liquids, or solids), or flame sensors (to sense the presence and quality of fire). In an embodiment, the netting 102 is tethered to the UAV 106 through an attachment point 108. The attachment point 108 may be a fitting extended from the UAV 106. In an embodiment, the attachment point 108 may either be integrated within the UAV 106 or may be retrofitted to the UAV 106.

Aided by the UAV 106, when the netting 102 is air-borne, the netting 102 may take a round concave shape, for example, the shape of a parachute. The netting 102 may be made up of a fire-retardant netting weave 104, for example, a weaved Kevlar® netting with netting size or porosity (i.e.,, size of the holes of the netting) based on the present wind conditions. In an embodiment, the netting 102 may be weaved, such that, based on the changing wind conditions, the netting size or porosity may be automatically adjusted. The auto adjustment of the netting size or porosity may be controlled by the UAV 106 based on one or more of the changing wind conditions, size of the embers, or the quality of fire as determined by one or more of the plurality of sensors within the UAV 106. Alternatively or additionally, data related to the changing wind conditions, size of the embers, or the quality of fire may be received from a satellite or a base station controller that is communicatively coupled to the UAV 106. The fire-retardant netting weave 104 may also include multiple layers that are interspersed to capture the flying embers 110. By way of an example, size of the netting 102 may vary based on a target area where it is to be deployed and size/capacity of the UAV 106.

Once the flying embers 110 are caught in the fire-retardant netting weave 104, the UAV 106 may also be configured to spray water or a fire-retardant chemical on to the captured flying embers 110. To this end, the UAV 106 may carry a dedicated container 107 that includes water or a fire-retardant chemical. Alternatively, a separate dedicated drone may perform the functionality of spraying water or fire-retardant chemicals onto the captured flying embers 110. Examples of the fire-retardant chemicals may include, but are not limited to Phos-Chek® or other foam based fire-retardants.

As an example, the UAV 106 may be a heavy lift drone that is either autonomous or may be guided remotely via the base station controller. The UAV 106 may be one of a rotor wing aerial vehicle, a satellite, or a multiple propeller based aerial vehicle (for example, a tricopter having three rotors, a quadcopter having four rotors, a hexacopter having six rotors and an octocopter having eight rotors), and the like. The UAV 106 may rise, such as to a predetermined altitude above the surface, and may perform various predefined operations. An example of the predefined operations may include, but are not limited to scanning a target area (using one or more of the LiDAR sensor, the optical camera, or the thermal camera) to determine the overall area affected by the wildfire 112. Another example of the predefined operation may include, but is not limited to determining various attributes associated with the wildfire 112 using one or more of the temperature sensors, the anemometer, the proximity sensors, the particle sensors, the flow sensors, or the flame sensors. Examples of the attributes may include, but are not limited to direction and speed of the high-speed winds 114, intensity of the wildfire 112, or size and quantity of the flying embers 110.

In an embodiment, the netting system 100 may include a plurality of UAVs similar to the UAV 106, and each of the plurality of UAVs may hold the netting 102 from one of the multiple ends of the netting 102 in order to capture the flying embers 110. It may be note that in such a case, the netting 102 may have a polygonal shape (for example, a square or a rectangle). This is further depicted in conjunction with FIGS. 3A, 4, 5, and 6. Further, the UAV 106 may be a drone parachute, such that, the netting 102 may be included within the UAV 106. In this case, when the UAV 106 approaches the source of the wildfire 112 and is in close proximity, the netting 102 contained therein may be automatically deployed. Whether the UAV 106 is in close proximity to the source or not may be determined using one or more of the temperature sensor or the proximity sensors.

In addition to the plurality of sensors, the UAV 106 may also include a processor (not shown in FIG. 1) that is communicatively coupled to each of the plurality of sensors, a memory (not shown in FIG. 1) that is communicatively coupled to the processor, and a communication module (not shown in FIG. 1) that is communicatively coupled to the processor. The memory stores processor instructions that when executed, may cause the UAV 106, via the processor, to control the netting 102 in order to catch the flying embers 110 and thereby inhibit spread of the wildfire 112. The communication module may be used by the UAV 106 to communicate with one or more of the base station controller, a satellite, or other UAVs in the vicinity of the UAV 106.

The memory may further include an Artificial Intelligence (AI) model, an image processing module, and a UAV coordination module. The AI model may have been trained based on historic data that has been collated over a period of time from across different geographies. While collating the historic data, it is ensured that the entropy within the historic data is high. In other words, it is ensured that the historic data is well representative of various wildfire situations/conditions and is a nearly exhaustive set. One of a data set that is taken from the historic data and is associated with a wildfire incident, for example, may include details related to various wildfire attributes. These wildfire attributes may include one or more of, but is not limited to a location (coordinates etc) of an area affected during the wildfire incident, multiple optical/thermal images of the area captured after predefined time intervals that is representative of the speed and direction of spread of the wildfire during the entire duration of the wildfire, time of the year, weather, temperature, wind direction and speed, intensity of fire, terrain, forest density, type of trees, size of flying embers, type of other vegetation, surrounding areas (for example, mountains, rivers, or oceans), availability of water source in near vicinity, wildlife, population density in surrounding areas, road availability, time taken to control the wildfire, number of casualties, amount and scale of damage caused, specific observations of firefighters involved in the wildfire incident (for example, methods or techniques that proved effective in controlling the wildfire), and fire-retardant chemicals used.

After being collated, a weighted matrix may be created using the historic data. The weighted matrix may include multiple rows and columns, such that, each row may be dedicated to a specific wildfire incident and each column may include weighted values of various wildfire attributes as disclosed above. The values of the wildfire attributes, for example, may be vector representation of actual data. Further, the weights, for example, may be assigned by multiple firefighting experts from various countries based on their years of experience in the field. An AI model may then be trained using the values in the weighted matrix to control the UAV 106, in the current embodiment, and multiple such UAVs, in different embodiments, in order to efficiently control the netting 102 and maximize capture and subsequent dousing of the flying embers 110. Additionally, since a nearly exhaustive training data set is used, the AI model's output varies based on prevailing conditions of an actual wildfire situation. The AI model may be a neural network and the examples may include, but are not limited to Convoluted Neural Network (CNN), Recurrent Neural Network (RNN), Long Short Term Memory (LSTM), or Generative Adversarial Network (GAN).

During an actual implementation of the netting system 100, at times, an administrator at a control station (or the base station controller) may override control of the UAV 106 in order to accurately position the netting 102. In such case, the AI model may perform incremental learning based on the actions performed by the administrator. As a result, if a similar situation occurs again in future, the AI model may be able to accurately maneuver the UAV 106. The AI model may also communicate with the UAV coordination module and may thus enable the UAV 106 to work in tandem with other UAVs in the netting system 100. This is further explained in detail in conjunction with FIG. 3A. Moreover, the AI model in each UAV may adapt learnings form other AI models in other UAVs. Alternatively or additionally, learning of each AI model may be transferred to the base station controller or a central server that is communicatively coupled to each UAV. Thereafter, as part of a periodic software update, all these learnings may be updated in the AI model residing within each UAV.

In addition to performing incremental learning based on administrator overrides and actions performed by other UAVs, the AI model may also autonomously adapt actions of the UAV 106, when a previously unencountered situation arises. Such autonomously adapted actions may be performed by the AI model irrespective of absence of any such training data. In other words, the AI model may equip the UAV 106 to perform actions in response to unforeseen events, which human actors may fail to perform.

To further elaborate on functioning of the UAV 106 in a live scenario, the UAV 106 may capture data from the area where the wildfire 112 is occurring, using one or more of the plurality of sensors at predefined time intervals (for example, every 30 seconds). As described before, the data may include multiple optical/thermal images of the area, temperature, wind direction and speed, intensity of fire, or size of flying embers. The captured data may then be used by the AI model to determine the actions that may be performed by the UAV 106. By way of an example, the UAV 106 may capture thermal and optical images after every 30 seconds. This data may be used an input to the AI model along with other captured data, based on which the AI model may determine an action that may be performed by the UAV 106 in controlling the netting 102. By way of another example, the UAV 106, by way of the LiDAR sensor, may capture a 3D representation of the affected area. This 3D representation as an input to the AI model may prove very-effective in planning maneuvering of the UAV 106, such that, the netting 102 may be deployed in front of a source that may end up being more detrimental in spreading the wildfire 112. Moreover, the 3D representation of the affected area may facilitate providing information to, for example, command personnel, and may also be utilized in development of a firefighting strategy using the system 100 with appropriate resources and instructions.

The AI model, by way of the optical and thermal cameras, may also capture data on the number of flying embers 110 that are successfully captured by the netting 102. This data may be shared with the base station controller and subsequently the command center.

It may be noted that the UAV 106 may be battery operated and may operate smoothly in smoky and high wind conditions. Solar powered batteries may also be used in the UAV 106 to ensure near continuous operation of the UAV 106 even in absence of a power source or a charging point nearby. In an example, while using a single UAV, the netting may be supported by a rigging extended from the UAV 106. Further, a weight/bar may be added at bottom of the netting 102. This facilitates spreading the netting 102 and maintaining the netting 102 in a flyable position.

As may be appreciated by those skilled in the art, that though the netting system 100 has been described to address catching embers to control spread of wildfire, the system may be functional in scenarios such as related to containment of pollens released by plants, airborne dust, sand, and other pollutants released at construction/demolition premises, radioactive material released during eruption of volcano, debris produced during occurrence of earthquake or landslide, locust swarms or other airborne pests and the like.

Figure 2A:
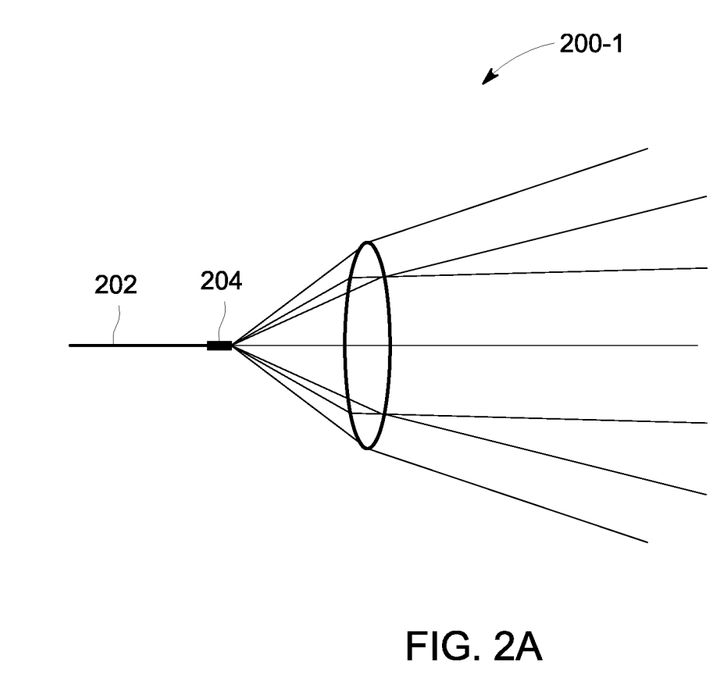
FIG. 2A is an exemplary schematic illustration of elements of a system for attaching the netting to a UAV, in accordance with an embodiment of the present invention.
Figure 2B:
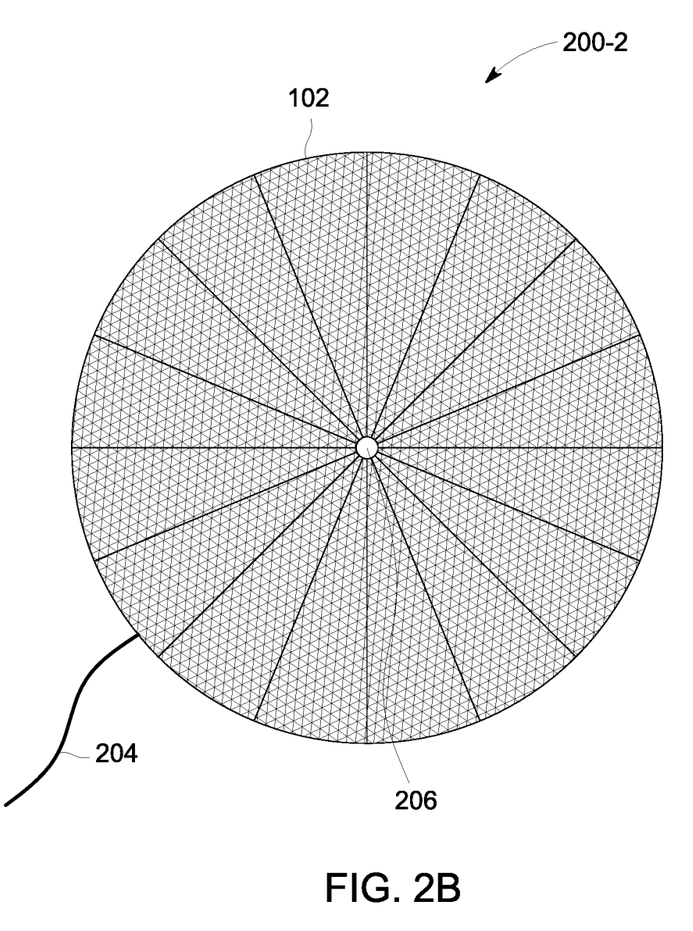
FIG. 2B is an exemplary schematic illustration of a top view of a netting, in accordance with an embodiment of the present invention.

With reference to FIG. 2A, at 200-1 an exemplary schematic illustration of elements of a system for attaching the netting 102 to the UAV 106 are provided, in accordance with an embodiment the present invention. A fire-resistant cord 202 is used to attach the netting 102 to the UAV 106 through a top hub 204, which facilitates attaching the netting 102 to the UAV 106. With reference to FIG. 2B, at 200-2 an exemplary schematic illustration of a top view of the netting 102 is provided, in accordance with an embodiment of the present invention. The netting 102 includes the fire-resistant cord 202 for attaching netting fabric of the netting 102 to a single rope. Further, the netting 102 may have multiple fire-resistant cords (not shown) for attaching the netting fabric to each of the rope. In addition, 206 represents a center hub for the netting 102 center attachment.

The netting 102 may be made of interspersed layers of a flame-retardant fabric (for example, Kevlar®). In an example, the flame-retardant fabric may be made by coupling with each other the flame-retardant fabric in an abutting and/or overlapping state with hook-and-eye systems or other coupling technologies. In an example, the netting 102 may have a set of flame-retardant fabrics which are embodied as mats having same predetermined size and shape, so that they can be stacked up for easy transportation. In another example, a mesh of the netting 102 may be created that has openings that are smaller than one inch.

Further, the flame-retardant fabric may include at least one woven layer containing silica glass, preferably (fibers of) pure silica glass in compound with aramide and/or aluminum silicate. The fabric may be composed of two, three or more identical or different layers. The fabric is fire-proof and provides a strong physical barrier against flying sparks, embers, or flame front of the wildfire. Further, the netting 102 may be made of flame-retardant fabric that may have a plurality of discrete sections of flame-retardant fabric, or entire flame-retardant fabric contains the flame-retardant substance, preferably by being dotted or immersed or filled with the flame-retardant substance. As an example, one square meter of the flame-retardant fabric contains between 50 and 150 milliliters, and so forth.

In an embodiment, the netting 102 may be made of the flame-retardant fabric having a soft or rigid structure and may be embodied as a shutter, jalousie, curtain, sheet, mat, tissue and the like. The netting 102 may be rectangular in shape, however, any other shape may be functional too.

In an embodiment, the netting 102 may be initially rolled up and attached to the UAV 106, and the UAV 106 may carry the netting 102 in said rolled up configuration, unrolling the netting 102 while aloft, and then positioning the netting 102 to catch burning embers. As an example, the netting 102 may be large enough to catch burning embers flying a high wind condition. The netting 102 may have at least a diameter of 20' if round in shape, of at least 20'×20' area if rectangular in shape, or of at least 50' in diameter if round in shape and at least 50'×50' area if rectangular in shape, or at least 100' in diameter if round and at least 100'×100' area if rectangular in shape, or larger.

Figure 3A:
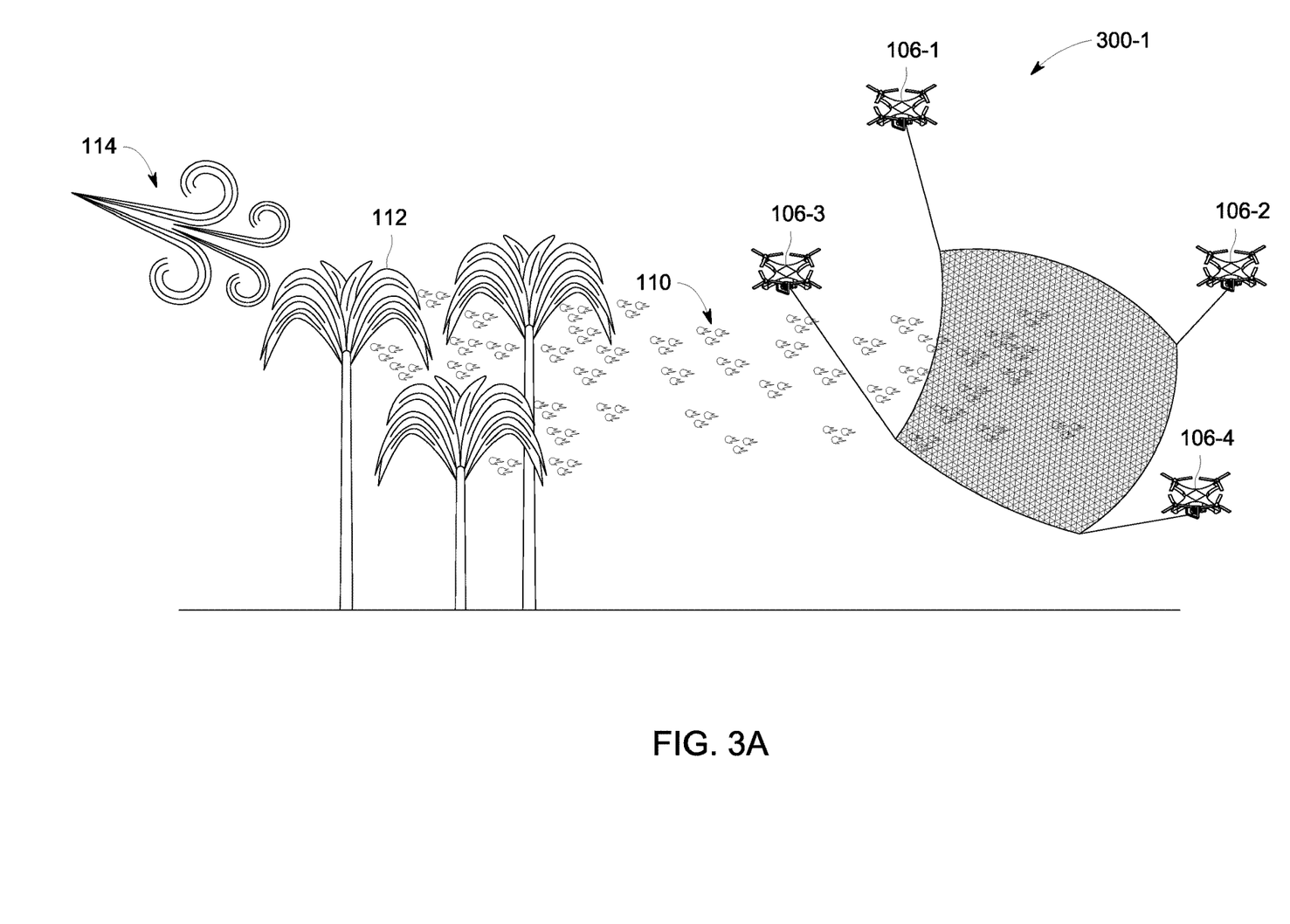
FIG. 3A is an exemplary schematic illustration of a netting arrangement supported by multiple UAVs during a completely air-borne operation scenario, in accordance with an embodiment of the present invention.

With reference to FIG. 3A an exemplary schematic illustration, at 300-1, of a netting system arrangement supported by multiple UAVs during a completely air-borne operation scenario is provided, in accordance with an embodiment of the present invention. As is illustrated, in the high-speed winds 114 the flying embers 110 from the burning trees due to the wildfire 112 are being spread in the surrounding areas. Also shown are a plurality of UAVs 106-1, 106-2, 106-3, and 106-4. It will be apparent to a person skilled in the art that each of the plurality of UAVs 106-1, 106-2, 106-3, and 106-4 are analogous to the UAV 106. In an example, the plurality of UAVs may form a swarm drone system. In this embodiment, the netting 102 is rectangular in shape. The netting 102 may be attached at the top two corners to the UAVs 106-1 and 106-2 and at the bottom two corners to the UAVs 106-3 and 106-4. As a result, the plurality of UAVs by flying in coordination may keep the netting 102 completely air-borne in order to capture the flying embers 110.

In an embodiment, the plurality of UAVs may communicate with each other in a coordinated manner to keep the netting 102 afloat and at a desired location in order to maximize the amount of captured flying embers 110. Because of the AI module in each of the plurality of UAVs, the co-ordination among the plurality of UAVs may be done without any manual intervention. In one implementation, one of the plurality of UAVs may be selected as a master UAV, while other UAVs may act as slave. In this case, the master UAV may be aware about current coordinates, current resources, specifications, or battery backup etc, for each of the slave UAVs. Thus, the master UAV may efficiently manage operation of each of the slave UAVs. In an alternate implementation, each of the plurality of UAVs may be aware about the above discussed details of other UAVs.

Irrespective of the mechanism used for coordination amongst the plurality of UAVs, the plurality of UAVs can adaptively change the shape and size of the netting 102 in order to maximize the amount of captured flying embers 110. This versatility is enabled as a result of the AI model that is present in each of the plurality of UAVs. The functionality of the AI model has been explained in detail in conjunction with FIG. 1. In an embodiment, the UAVs 106-1 and 106-2 may carry water and/or fire-retardant fluid that is sprayed on the netting 102 when the flying embers 110 are caught. In another embodiment, the UAVs 106-3 and 106-4 may provide a ballast to the netting 102 in order to lesson weight load of the UAVs the UAVs 106-1 and 106-2. The plurality of UAVs may be controlled remotely with autonomous features to stay on task. The plurality of UAVs may be controlled both with line-of-site hand-held controls as well as using a central monitor for fighting control from off-site location.

In an exemplary embodiment, during deployment of the plurality of UAVs to the wildfire affected area, the plurality of UAVs may be designed to carry the netting 102 as a roll that may be unfurled at the target location. The netting 102 when rolled up may be substantially easier to carry at a distance. The plurality of UAVs may carry the netting roll in an aerodynamic profile so as to consume less energy in order to quickly reach the target area.

Figure 3B:
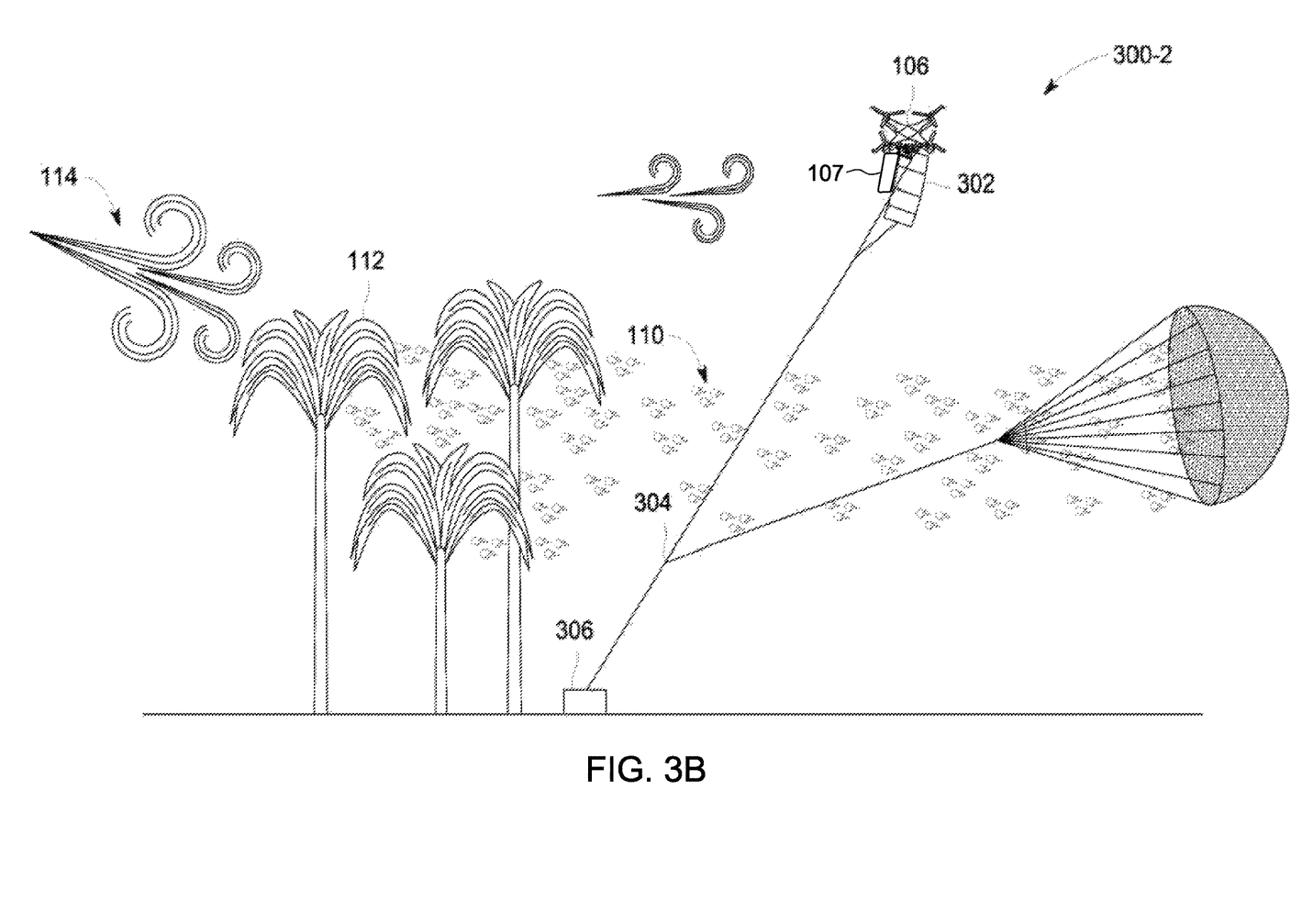
FIG. 3B is an exemplary schematic illustration of a netting system arrangement during a stationary operation scenario that uses a lifting kite and ballasts, in accordance with an embodiment of the present invention.

With reference to FIG. 3B, an exemplary schematic illustration, at 300-2, of a netting system arrangement during a stationary operation scenario that uses a lifting kite 302 and ballasts 306 to keep the netting 102 afloat is provided, in accordance with an embodiment of the present invention. As is illustrated, in the high-speed winds 114, the flying embers 110 from the burning trees due to the wildfire 112 are being spread across the surrounding areas. In this embodiment, the UAV 106 is coupled or tethered to the lifting kite 302. An example of the lifting kite 302 may include, but is not limited to a "French Military Kite" or a "Rescue Kite" which is a triangular winged box kite that is similar to a classic box kite but has only three sides to the box instead of four and further has dihedral wings added to one surface, which increases its side to side stability. This type of kite may be favored due to its ability to lift payloads (for example, antennas) in a wide variety of conditions.

In this embodiment, the UAV 106 merely maneuvers the lifting kite 302, while the lifting kite 302 performs lifting of the netting 102. An attachment point 304 connects the lifting kite 302 with the netting 102. The netting 102 is further tethered to the ground by using the ballasts 306. The ballasts 306, for example, may be concrete blocks that ensure that the netting 102 does not fly away because of the high-speed winds 114, while the lifting kite 302 keeps the netting 102 afloat. The lifting kite 302 may use the wind to lift the netting 102 and the UAV 106 may keep the lifting kite 302 in a destined location. In another example, the lifting kite 302 may only be used for holding the netting 102 thus saving energy that the UAV 106 may have spent in keeping the netting 102 afloat. This enables substantial increase in the flight time of the UAV 106. It may be apparent to a person skilled in the art that the lifting kite 302 may be replaced by a balloon, a kite-balloon, or a kytoon.

In this stationary operation scenario, the UAV 106 may be supplied power from a ground station and may be fed with pressurized water supply or fire-retardant chemical to continually wet the netting 102 in order to douse the captured flying embers 110. The stationary operation scenario is applicable along expressways or freeways (for example, a 101 freeway) and other locations that may be used to control wind driven wildfires. Further, in the stationary operation scenario, each of the UAVs may deploy a lifting kite. Each of the lifting kites may be equipped with a drone like technology for maneuvering the netting or supporting the lifting kite.

Figure 4:
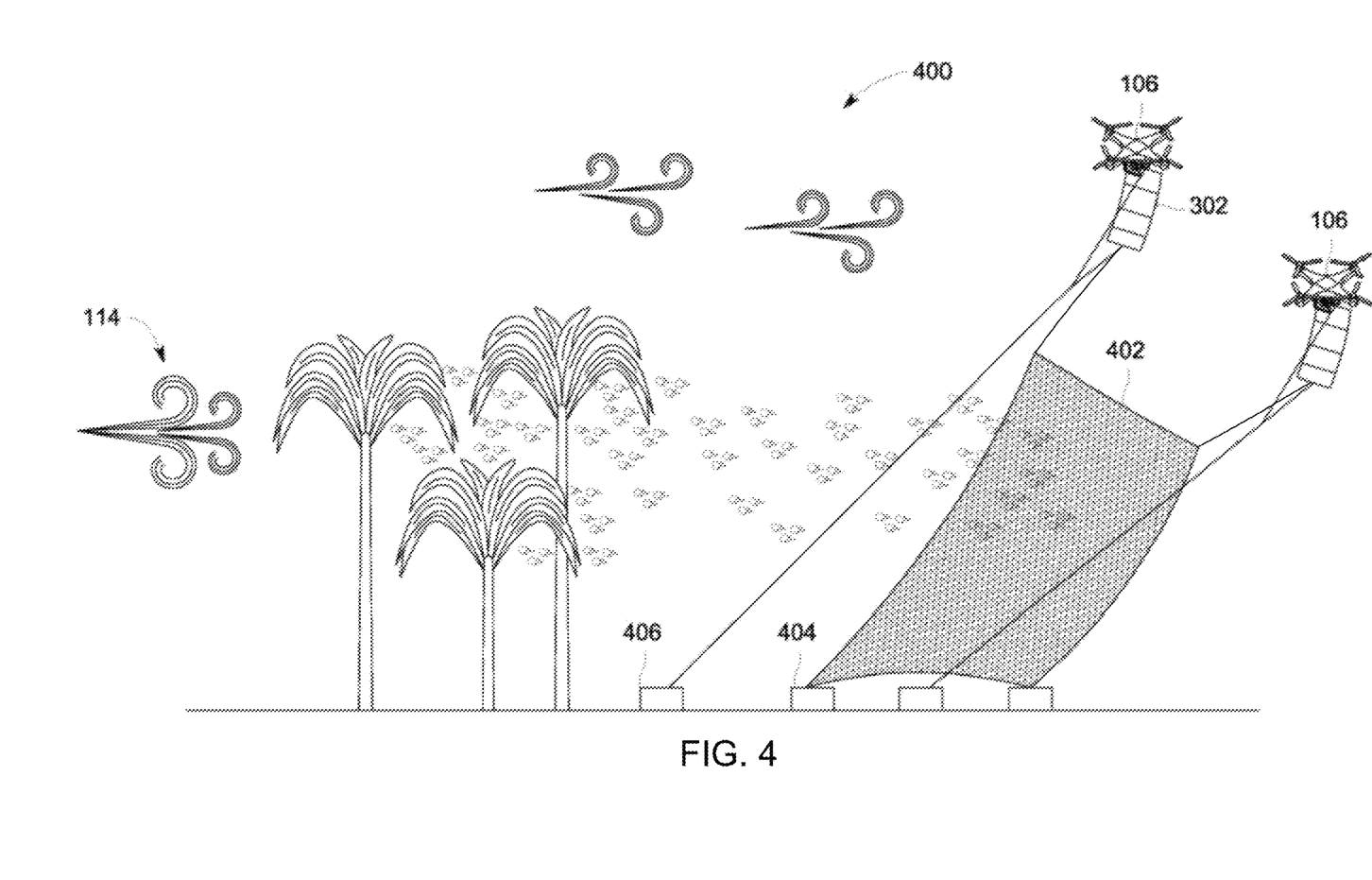
FIG. 4 is an exemplary schematic illustration of a netting system arrangement having multiple UAVs during a stationary operation scenario that uses ballasts, in accordance with an embodiment of the present invention.

With reference to FIG. 4, an exemplary schematic illustration, at 400, of a netting system arrangement having multiple UAVs during a stationary operation scenario that uses ballasts 404 and 406 is provided, in accordance with an embodiment of the present invention. As illustrated, a netting 402 is deployed at a fixed location using the ballasts 404. The bottom corners of the netting 402 are tethered to the ballasts 404. The ballasts 406 are used for deploying the lifting kites 302, which are tethered to the ballasts 406 and also the top corners of the netting 402. Each of the UAVs 106 are further attached to the respective lifting kites 302 and maneuver the lifting kites 302 in order to change the direction of deployment of the netting 402. As shown, the netting 402 may capture the flying embers 110 that are flying in direction of the wind and may thus stop their spread further. The UAVs 106 may also be tethered to the ground and may be provided a supply of fire-retardant material from the ground through a connecting tube. The tube may be adapted to spray the fire-retardant material onto the flying ember 110 captured by the netting 402.

By way of an example, an attachment means may be provided for attaching the lifting kites 302 to the netting 402. Due to the attachment, the netting 402 may be carried and held aloft by the lifting kites 302. The netting 402 being of a mesh like material allows air to flow through the mesh but is sufficiently tight to capture the flying embers 110. Also, as stated before, the UAVs 106 may be attached to one or more of the lifting kites 302 and the netting 402, such that, the UAVs 106 may position the netting 402 at a desired location to catch the flying embers 110. As may be appreciated, the UAVs 106 may be capable of releasing the netting 402 over a source or a potential source that may release the flying embers 110 so as to inhibit further release of the flying embers 100.

Figure 5:
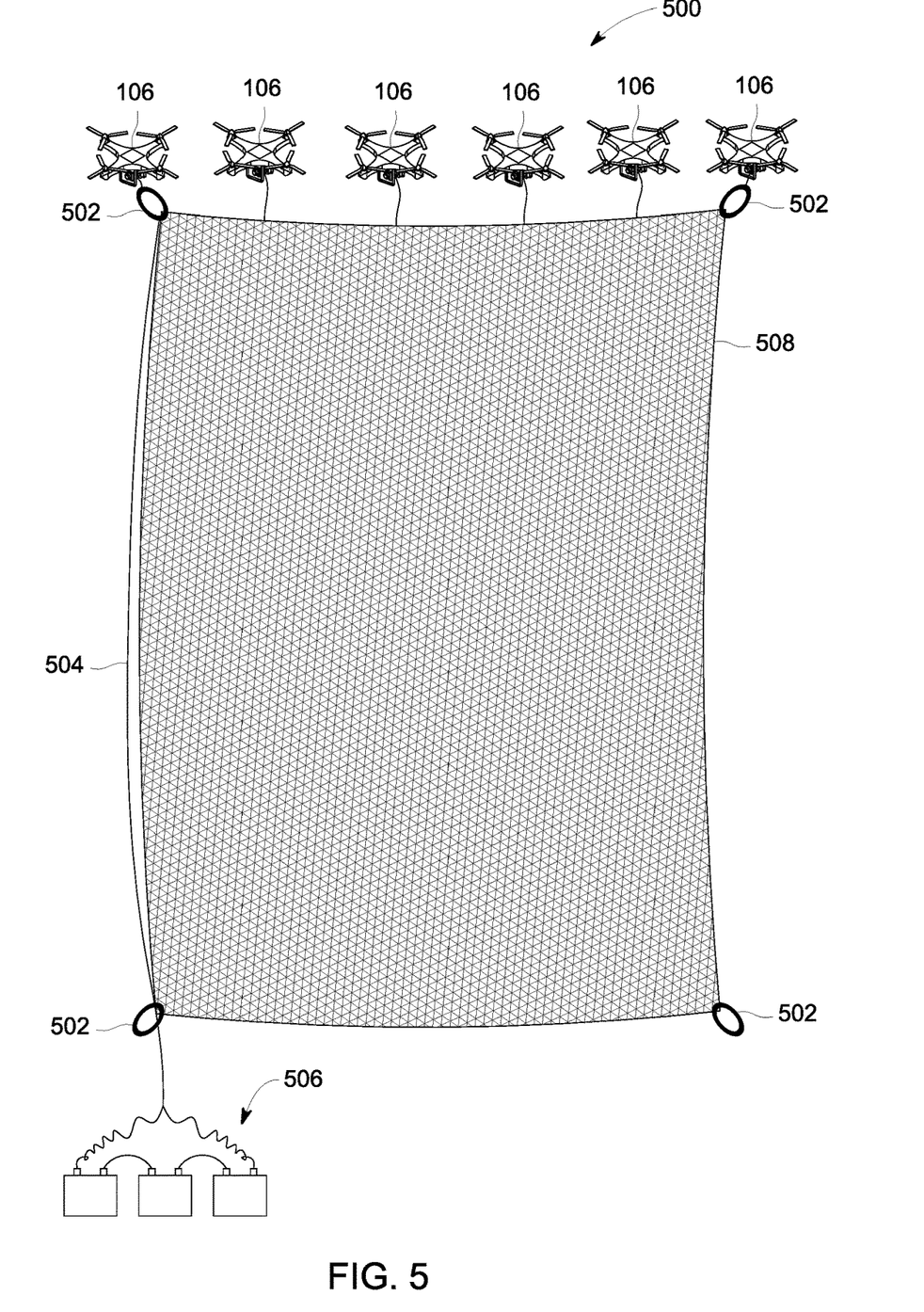
FIG. 5 is an exemplary schematic illustration of a netting system supported by external battery and water supply, in accordance with an embodiment of the present invention.

With reference to FIG. 5, an exemplary schematic illustration, at 500, of a netting system supported by external batteries 506 and water supply is provided, in accordance with an embodiment of the present invention. As is shown, a netting 508 may be held by a plurality of UAVs 106 (for example, a quadcopter). The netting 508 may be held by each of the UAVs 106 by tethering the netting 508 to an attachment point of each of the UAVs 106. By way of an example, the UAVs (for example, a quadcopter) may be capable of operating under wind speed conditions of up to 70 mph, i.e., the quadcopter may be capable of standing still and catching the embers using the netting 508 when the wind is blowing at a speed of 70 mph. The netting 508 may have dimensions of around 200'×200'. Anchors 502 may be placed at each lower end of the netting 508 for holding the netting 508 and for directing a power wire to the UAVs 106 from the external batteries 506. The external batteries 506 aid in operating the UAVs 106 for a much longer duration. As a result, the netting 508 may be kept afloat for a much longer time. In place of the external batteries 506, a water supply source (not shown in FIG. 5) may also be used. The water supply source may be used to provide continuous water supply to the UAVs 106 in order to douse burning embers captured by the netting 508. The water supply source may be replaced by a supply source of a fire-retardant material.

Figure 6:
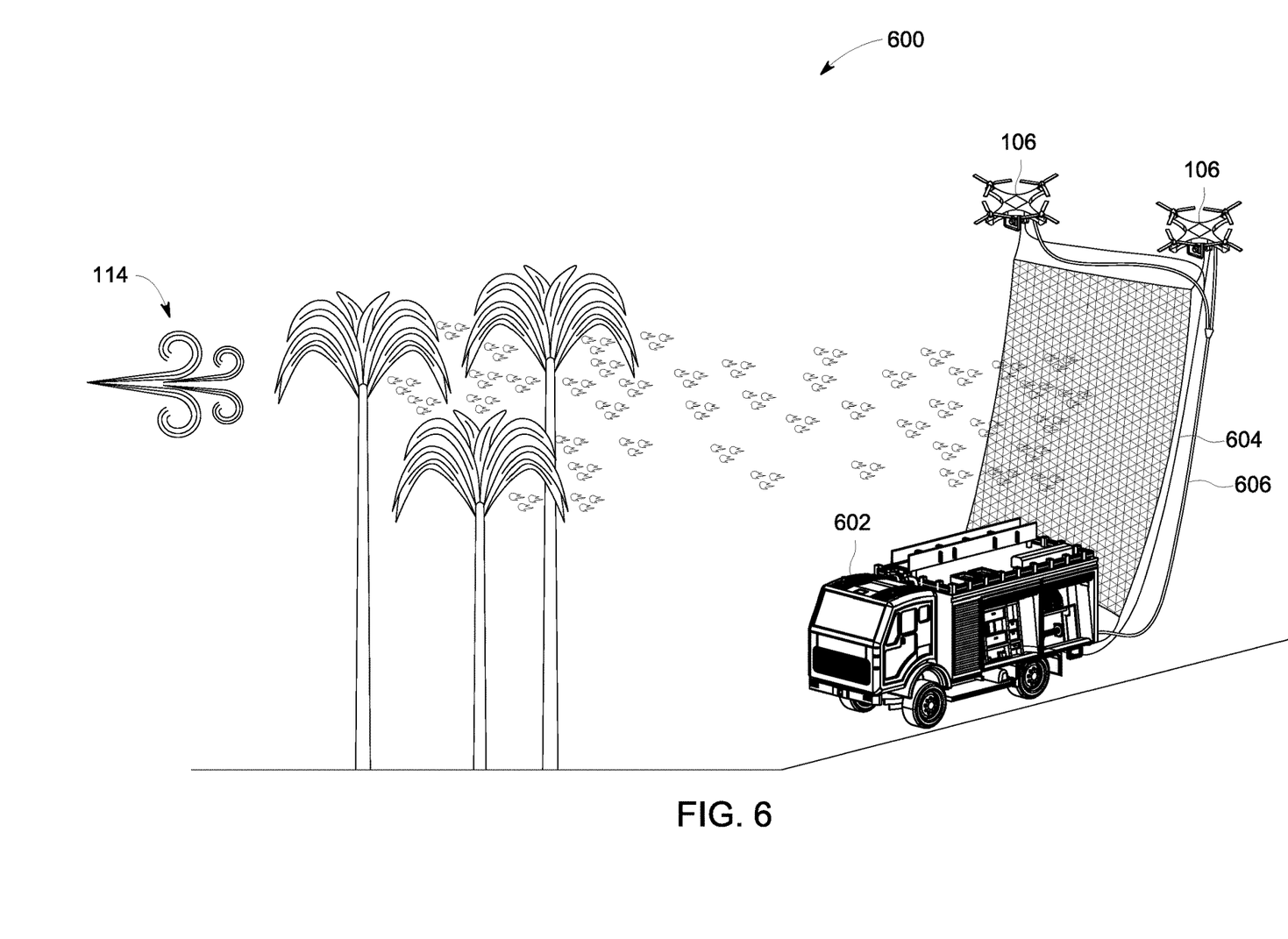
FIG. 6 is an exemplary schematic illustration of a netting system arrangement supported by a fire truck or other vehicle, in accordance with an embodiment of the present invention.

With reference to FIG. 6, an exemplary schematic illustration, at 600, of a netting system arrangement supported by a fire truck 602 or other vehicles is provided, in accordance with an embodiment of the present invention. The netting system includes two UAVs 106, the netting 508, a power wire 604, and a supply hose 606. The netting 508 at the bottom corners may be fixed or tethered to the fire truck 602. Thus, when compared to the embodiment disclosed in FIG. 4, the ballasts 404 may be replaced by the fire truck 602. Additionally, the fire truck 602, via the power wire 604, may provide external battery support to each of the two UAVs 106. As a result, the operating time of the two UAVs 106 may be increased exponentially, since the fire truck 602 may have the ability to carry large external batteries or even generators. Thus, when compared to the embodiment disclosed in FIG. 5, the external batteries 506 may be replaced by the fire truck 602. The fire truck 602, via the supply hose 606, may also provide continuous water supply to the two UAVs 106 in order to douse burning embers captured by the netting 508. Instead of water, the fire truck 602 may also supply a fire retardant material via the supply hose 606, to the two UAVs 106. In an embodiment, the fire truck 602 may directly spray water or fire-retardant material on to the netting 508 in order to douse the burning embers captured in the netting 508.

In an embodiment, an additional fire truck (not shown in FIG. 6) similar to the fire truck 602 may also be used. In this configuration, one of the bottom ends of the netting 508 may be attached to the fire truck 602, while other end of the netting 508 may be attached to another fire truck (not shown in FIG. 6). Thus, in this configuration, the two fire trucks may be able to pull taught the netting 508. Moreover, the netting 508 of a much bigger size when compared to the single fire truck configuration may be used, since the distance between the two fire trucks may be increased to the extent that the terrain support it.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated.

What is claimed is:

1. An Unmanned Aerial Vehicle (UAV) controlled netting system, said system comprising:
    a mesh netting, wherein the mesh netting comprising a plurality of nettings arranged as interspersed layers in a mesh form, and where each of the plurality of nettings has fire-resistant property;

a direct powered UAV present at a ground location;
a lifting kite coupled to the UAV at one end and configured to attach to the mesh netting at another end, where the lifting kite carries and holds the mesh netting aloft when the UAV brings the lifting kite at an aloft position such that a particular source is covered with the mesh netting; and
a dedicated container coupled to the UAV at one end for carrying water or a fire retardant chemical, and wherein the UAV is configured to spray the water or the fire retardant chemical on to a plurality of embers using the dedicated container.

2. The UAV controlled netting system of claim 1, wherein the UAV further comprises a plurality of sensors within the UAV to determine a quality of fire.

3. The UAV controlled netting system of claim 1, wherein the UAV is further configured to perform predefined operations, wherein the predefined operations comprise scanning a target area to determine an overall area affected by wildfire.

4. The UAV controlled netting system of claim 1, wherein the UAV is further configured to perform actions in response to unforeseen events using an Artificial Intelligence (AI) model, wherein the AI model is configured to autonomously adapt the actions of the UAV.

5. The UAV controlled netting system of claim 1, wherein the mesh netting is supported by a rigging extended from the UAV.

* * * * *